(12) United States Patent
McElligott

(10) Patent No.: US 12,059,993 B1
(45) Date of Patent: Aug. 13, 2024

(54) CARGO TRAILER ACCESS DOOR SECURITY BARRIER

(71) Applicant: Frank McElligott, Plano, TX (US)

(72) Inventor: Frank McElligott, Plano, TX (US)

( * ) Notice: Subject to any disclaimer, the term of this patent is extended or adjusted under 35 U.S.C. 154(b) by 190 days.

(21) Appl. No.: 17/973,682

(22) Filed: Oct. 26, 2022

(51) Int. Cl.
*B60P 7/13* (2006.01)
*E05B 65/00* (2006.01)
*E05B 83/02* (2014.01)
*E05C 17/04* (2006.01)
*E05C 19/00* (2006.01)
*E05C 19/18* (2006.01)

(52) U.S. Cl.
CPC ............ *B60P 7/13* (2013.01); *E05B 65/0003* (2013.01); *E05B 65/0021* (2013.01); *E05B 83/02* (2013.01); *E05C 17/047* (2013.01); *E05C 19/003* (2013.01); *E05C 19/18* (2013.01)

(58) Field of Classification Search
CPC .. E05B 65/0003; E05B 65/0021; E05B 83/12; E05B 83/44; E05B 13/001; E05B 13/002; E05B 83/02; B60P 7/13; B65D 2211/00; E05C 19/003; E05C 19/184; E05C 17/047; E05C 19/18
See application file for complete search history.

(56) References Cited

U.S. PATENT DOCUMENTS

| | | | | |
|---|---|---|---|---|
| 2,764,442 A * | 9/1956 | Weaver | ............... | E05B 65/0835 |
| | | | | 292/213 |
| 2,877,840 A * | 3/1959 | Hurowitz | ................ | E04F 10/00 |
| | | | | 160/91 |
| 3,321,229 A * | 5/1967 | Eckel | .................... | E05C 19/003 |
| | | | | 292/108 |
| 3,374,030 A * | 3/1968 | Brisebois | .................. | B60P 7/13 |
| | | | | 414/373 |
| 3,575,118 A * | 4/1971 | Gramse | ................ | B61D 45/007 |
| | | | | 410/75 |
| 3,952,453 A * | 4/1976 | Amburgey | ............ | E01F 13/022 |
| | | | | 49/34 |
| 3,976,213 A * | 8/1976 | Ball | ....................... | B60P 3/1025 |
| | | | | 414/549 |
| 4,078,836 A * | 3/1978 | Wilson | .................. | E05C 19/003 |
| | | | | 292/259 R |
| 4,091,741 A | 5/1978 | Hartkorn | | |
| 4,262,503 A * | 4/1981 | Kuebler | ................ | E05C 19/003 |
| | | | | 292/259 R |
| 4,747,181 A * | 5/1988 | Davis | .................... | E05C 19/003 |
| | | | | 16/82 |

(Continued)

FOREIGN PATENT DOCUMENTS

| | | | | |
|---|---|---|---|---|
| DE | 102005051259 B3 * | 3/2007 | ................ | B60J 5/14 |
| DE | 102009031035 A1 * | 1/2011 | ........... | E05C 19/184 |

(Continued)

*Primary Examiner* — Christine M Mills
*Assistant Examiner* — Faria F Ahmad
(74) *Attorney, Agent, or Firm* — Charlotte W. Catlett

(57) ABSTRACT

The present invention is a cargo trailer security apparatus for use with a cargo trailer or similar container having rear entry outward swing or roll-up doors. The security apparatus creates a barrier to entry into the interior cargo space through the rear doors when the trailer is backed against the apparatus. The apparatus includes a base assembly with a bollard, a support assembly having a vertical central post and two parallel barrier mounted on the central post, and a door handle and latch block.

9 Claims, 12 Drawing Sheets

(56) References Cited

U.S. PATENT DOCUMENTS

| | | | | |
|---|---|---|---|---|
| 4,772,053 A * | 9/1988 | Oxley | E05C 19/003 292/259 R |
| 4,826,371 A * | 5/1989 | Brown | B61D 45/007 410/72 |
| 4,854,791 A | 8/1989 | Brown | |
| 4,867,622 A * | 9/1989 | Brown | B61D 45/007 410/94 |
| D304,672 S * | 11/1989 | Pearson | D8/331 |
| 5,131,186 A * | 7/1992 | Lamont | E05C 19/003 49/55 |
| 5,150,591 A * | 9/1992 | Norden, Jr. | E05C 19/003 292/DIG. 60 |
| 5,169,042 A * | 12/1992 | Ching | B60R 9/06 224/535 |
| 5,228,607 A * | 7/1993 | Tolsdorf | B60R 9/06 224/520 |
| 5,294,159 A * | 3/1994 | Corrigan | E05B 65/0888 292/263 |
| 5,509,701 A * | 4/1996 | Reinhard | E05C 19/003 292/259 R |
| 5,547,236 A * | 8/1996 | Gregory | E05C 19/182 292/288 |
| 5,560,666 A * | 10/1996 | Vieira | B60P 3/40 410/116 |
| 5,740,628 A * | 4/1998 | Almond | E06C 9/10 49/141 |
| 5,924,751 A * | 7/1999 | Moore | E05C 17/047 292/288 |
| 5,927,107 A * | 7/1999 | Mitchell | E05C 19/003 292/259 R |
| 6,099,220 A * | 8/2000 | Poth | B60P 7/08 410/121 |
| 6,237,377 B1 * | 5/2001 | Vasquez, Sr. | E05C 19/184 70/237 |
| 6,308,996 B1 * | 10/2001 | Ganimian | E05C 19/003 292/259 R |
| 6,349,573 B1 * | 2/2002 | Johnson | B60R 25/00 70/101 |
| 6,393,879 B1 * | 5/2002 | William | E05B 73/007 70/164 |
| 6,412,835 B1 * | 7/2002 | Patterson | E05B 83/12 292/259 R |
| 6,454,323 B1 * | 9/2002 | Mills | E05C 19/004 292/338 |
| 6,513,852 B1 * | 2/2003 | Krist | B60J 5/108 296/50 |
| 6,517,134 B2 * | 2/2003 | Armstrong | B60R 9/06 296/26.05 |
| 6,564,599 B2 * | 5/2003 | Eagleson | B62D 33/0273 70/164 |
| 6,583,713 B1 | 6/2003 | Bates | |
| 6,675,615 B1 * | 1/2004 | Williams | E05B 73/007 70/164 |
| 6,866,452 B2 * | 3/2005 | Khattab | B61D 45/007 410/70 |
| 7,195,294 B1 * | 3/2007 | White | E05C 19/003 292/259 R |
| 7,293,946 B1 * | 11/2007 | Fuller | B60P 7/13 410/43 |
| 7,331,623 B1 * | 2/2008 | Wall | B60R 9/00 296/3 |
| 7,350,837 B1 * | 4/2008 | Faires | E05C 19/003 292/259 R |
| 7,661,733 B1 * | 2/2010 | Angel | E05C 19/003 292/259 R |
| 8,438,885 B2 * | 5/2013 | Calder | E05B 47/0603 109/57 |
| 8,464,460 B1 * | 6/2013 | Runyan | F41J 1/00 296/182.1 |
| 8,627,971 B2 * | 1/2014 | Lancaster | B65D 90/22 292/259 R |
| 8,794,866 B2 * | 8/2014 | Petryshyn | E01F 13/085 404/6 |
| 9,163,441 B1 * | 10/2015 | Taylor, III | E05C 19/003 |
| 9,995,064 B2 * | 6/2018 | Caumartin | B60R 25/01 |
| D925,774 S * | 7/2021 | Anderson | D25/48.5 |
| 11,189,138 B2 * | 11/2021 | Anderson | E01F 13/06 |
| 11,529,902 B2 * | 12/2022 | Kismarton | B61D 3/16 |
| 11,530,558 B2 * | 12/2022 | Grant | E05C 19/003 |
| D1,014,336 S * | 2/2024 | McElligott | D12/162 |
| 2004/0055345 A1 * | 3/2004 | Moore | E05B 81/70 70/257 |
| 2005/0092800 A1 * | 5/2005 | Wilson | B60R 9/08 224/513 |
| 2007/0164573 A1 * | 7/2007 | Reimer | B65D 90/008 292/259 R |
| 2009/0160200 A1 * | 6/2009 | Greenway | E05C 7/04 292/268 |
| 2009/0236864 A1 * | 9/2009 | Ehrlich | E05B 9/08 292/217 |
| 2010/0064585 A1 * | 3/2010 | Gertz | E05C 19/184 292/259 R |
| 2018/0010369 A1 * | 1/2018 | Witchey | E05C 19/18 |
| 2018/0065792 A1 * | 3/2018 | Chen | B25H 3/003 |
| 2018/0333600 A1 * | 11/2018 | Pristach | E05C 19/003 |
| 2018/0347236 A1 * | 12/2018 | Smith | E05C 17/525 |
| 2019/0078363 A1 * | 3/2019 | Keyser | E05C 19/003 |
| 2019/0284854 A1 * | 9/2019 | Geenens | E05B 45/06 |
| 2019/0367298 A1 * | 12/2019 | Casanova | B60P 7/13 |
| 2020/0002983 A1 * | 1/2020 | Breland | E05B 63/0056 |
| 2020/0102775 A1 * | 4/2020 | Goss | E05B 63/12 |
| 2020/0392756 A1 * | 12/2020 | Bunger | E05B 17/002 |
| 2020/0399941 A1 | 12/2020 | Grant | |
| 2023/0399880 A1 * | 12/2023 | Kelch | E05B 65/10 |

FOREIGN PATENT DOCUMENTS

| | | | | |
|---|---|---|---|---|
| GB | 2218460 A | * | 11/1989 | E05C 19/003 |
| GB | 2399384 A | * | 9/2004 | B60J 5/125 |
| WO | WO-2018167479 A1 | * | 9/2018 | E05C 19/003 |

* cited by examiner

CARGO TRAILER ACCESS DOOR SECURITY BARRIER

BACKGROUND OF THE INVENTION

(1) Field of the Invention

The cargo trailer access door security barrier is an apparatus for cargo transportation containers, and more particularly, an access door security barrier for preventing the breach of the rear doors on a parked cargo semi-trailer or stationary container.

(2) Background Art

In the shipping industry, there is no absolute guarantee of protection against cargo theft. Thieves target all areas where the freight passes, regardless of whether it is in transit or stored. Whenever a loaded semi-trailer or other cargo container is left unattended in either a secured shipping yard or attached to a tractor unit, it is at high risk for break-ins. Most often, break-ins and theft of the cargo through rear-entry access doors happen when the truck driver stops at a truck stop or large retail parking lot for food, gasoline, or rest. The dire consequences of theft during necessary driver rest stops fuels the oft repeated industry phrase of "freight at rest is freight at risk."

In the shipping industry, the standard cargo truck includes two main sections, the tractor unit and the semi-trailer. Commonly, the tractor unit is owned by the independent truck driver, whereas semi-trailer units are owned by the shipper, distributor, or manufacturer of the cargo. In a standard fifty-three foot cargo trailer, the unit includes an enclosed cargo space of approximately 3,489 cubic foot capacity, rear doors opening to an approximate 108 inch height and 94 inch width, as well as landing gear at the front of the trailer and tandem axles at the back. Such semi-trailers are outfitted with rear entry access to the cargo area. Access to the cargo area is typically through either two latching outward swing doors or a single roll-up door which latches to the rear floor of the trailer.

Most often, a driver picks up a load from a point of origin, travels to the destination point, and drops off the loaded trailer. Anti-theft means attached to semi-trailers by the shipper, distributor, or manufacturer, such as improved locking mechanisms and electronic tracking and surveillance devices, have done little to decrease the occurrence of cargo theft during transportation, hence such crimes and losses remain at high levels. Regardless of the materials, configuration, and design of improved locking mechanisms, thieves continue to quickly adapt and breach the doors to gain entry into the cargo area. In 2019 alone, the trucking insurance industry lost over $47,000,000 in claims due to cargo theft which occurred while the driver slept or otherwise moved briefly away from the transport vehicle. Overall supply chain loss is estimated at upwards of $30 billion per year in the United States. These numbers are especially disquieting since most goods manufactured domestically are transported by truck in the continental United States.

A report on cargo theft in 2020 notes that for cargo in-transit, "truck stops and parking lots at retailer locations were the most common locations for theft. Locks and seals were minimally deterrent for amateur thieves only, as professional thieves are readily able to penetrate any known locking system to obtain the cargo." Thetrucker.com, "Common Sense Caution Offer Protection Against Cargo Theft." Accessed May 12, 2021. See also Industryweek.com, "7 Steps to Prevent Cargo Theft." Accessed May 12, 2021 (Manufacturers of consumer electronics, food, or apparel find their goods at highest risk); BSIGroup.com, "BSI Supply Chain Risk Insights Report 2021," Accessed May 12, 2021; ttnews.com, "Cargo Theft Trends Shift Amid Emboldened Criminals," Accessed Jul. 7, 2022; and BSIGroup.com, "A Review of Cargo Crime in 2021," Accessed Oct. 11, 2022.

Examples of door locking mechanisms, barricades, and electronic devices known in the industry include the disclosures of: U.S. Pat. No. 6,583,713 to Benjamin G. Bates, entitled "Method of Controlling Access to a Movable Container and to a Compartment of a Vehicle, and a Secure Cargo Transportation System;" U.S. Pat. No. 4,854,791 to James T. Brown, entitled "Container Door Barricade;" U.S. Pat. No. 4,091,741 to Albert Hartkorn, entitled "Security Device;" and U.S. Patent Application Publication No. 2020/0399941 to Christopher Grant, et al, entitled "Security Barrier for Outward-Swing Doors of Vehicles and Method Thereof."

In order to more effectively deter such cargo theft, the cargo transport industry needs an improved security apparatus to deter theft through the rear access doors of cargo containers and transport vehicles, most especially those of cargo semi-trailers on transcontinental routes which are left unattended during a driver's brief rest stops. The apparatus of the present invention meets the need for improved security for trailer units at rest in unsecured parking areas and cargo container yards.

BRIEF SUMMARY OF THE INVENTION

The present invention is a cargo trailer security barrier for decreasing the risk of theft from the interior of a container having rear door access through either a single roll-up door or double outward swing doors. In a main embodiment, the moveable security apparatus includes a base assembly, a vertical support assembly, and a door handle block or latch shield. The base assembly of the moveable apparatus includes a back base plate having a bollard on the top surface, two fixed extension base plates adjacent to the front edge of the back base plate, and additional extension plates movably attached to the fixed base plates. The back base plate, fixed plates and plurality of hinged base plates provide support and balance to the security barrier apparatus. The vertical support structure includes a center vertical support post and two horizontal cross beams attached to the front face of the support post. The door handle block and latch shield is a rectangular box fixed between the bollard and lower horizontal arm of the vertical support assembly.

In one aspect of the invention, the bollard is an inverted U-shape, defined by two parallel vertical posts and a horizontal beam. Each vertical post has top and bottom ends, with the horizontal beam fixed between the top ends. The bottom ends of the vertical posts are secured to the back plate of the base assembly. Conventional securing means such as welding are used throughout the construction of the base assembly, bollard, vertical support structure, and handle latch shield. The horizontal beam of the bollard alternatively includes a collar for receiving and securing the center post of the vertical support structure to the back surface of the bollard.

In another embodiment of the invention, the back plate of the base assembly includes two flanges for receiving and securing with bolts, the center post of the vertical support assembly to the back plate. In another aspect of the invention, a front bolt cover is secured adjacent to the front of the center post and the base plate to make the front of the bolts inaccessible. In another embodiment, a rear support brace is attached to the back of the center post to increase stability during use as well as limit access to the rear of the bolts used to secure the vertical post of the support assembly to the base plate.

In another aspect of the invention, the handle block is a rectangular box secured to the center post between the lower beam and the horizontal arm of the bollard.

In another embodiment of the present invention, the vertical support assembly of the moveable security apparatus has only one horizontal cross beam mounted near the top of the central post, and the handle block extends from the top of the horizontal beam of the bollard to the base of the horizontal cross beam.

In yet another embodiment of the instant invention, a cargo trailer security barrier is provided that includes a bollard, a vertical support assembly, a door handle block and a back support. In one aspect, the two vertical legs of the bollard, as well as the vertical central post of the support assembly, are embedded below ground level, and the back brace support is mounted on the rear surface of the central post adjacent to the ground.

In another alternative embodiment of the present invention, a security apparatus for decreasing the risk of theft from a cargo trailer or container is provided having a base assembly with a bollard, a vertical support assembly, and a door handle block where the vertical support assembly includes a center support post and one horizontal cross arm proximal to the top of the center support post. In this instance, the door handle block extends from the horizontal arm of the bollard to the single cross arm of the vertical support assembly.

BRIEF DESCRIPTION OF THE SEVERAL VIEWS OF THE DRAWING

The invention will be better understood and its numerous objects and advantages will become more apparent to those skilled in the art by reference to the following drawings, in conjunction with the accompanying specification, in which.

DETAILED DESCRIPTION OF THE INVENTION

Figure 1:
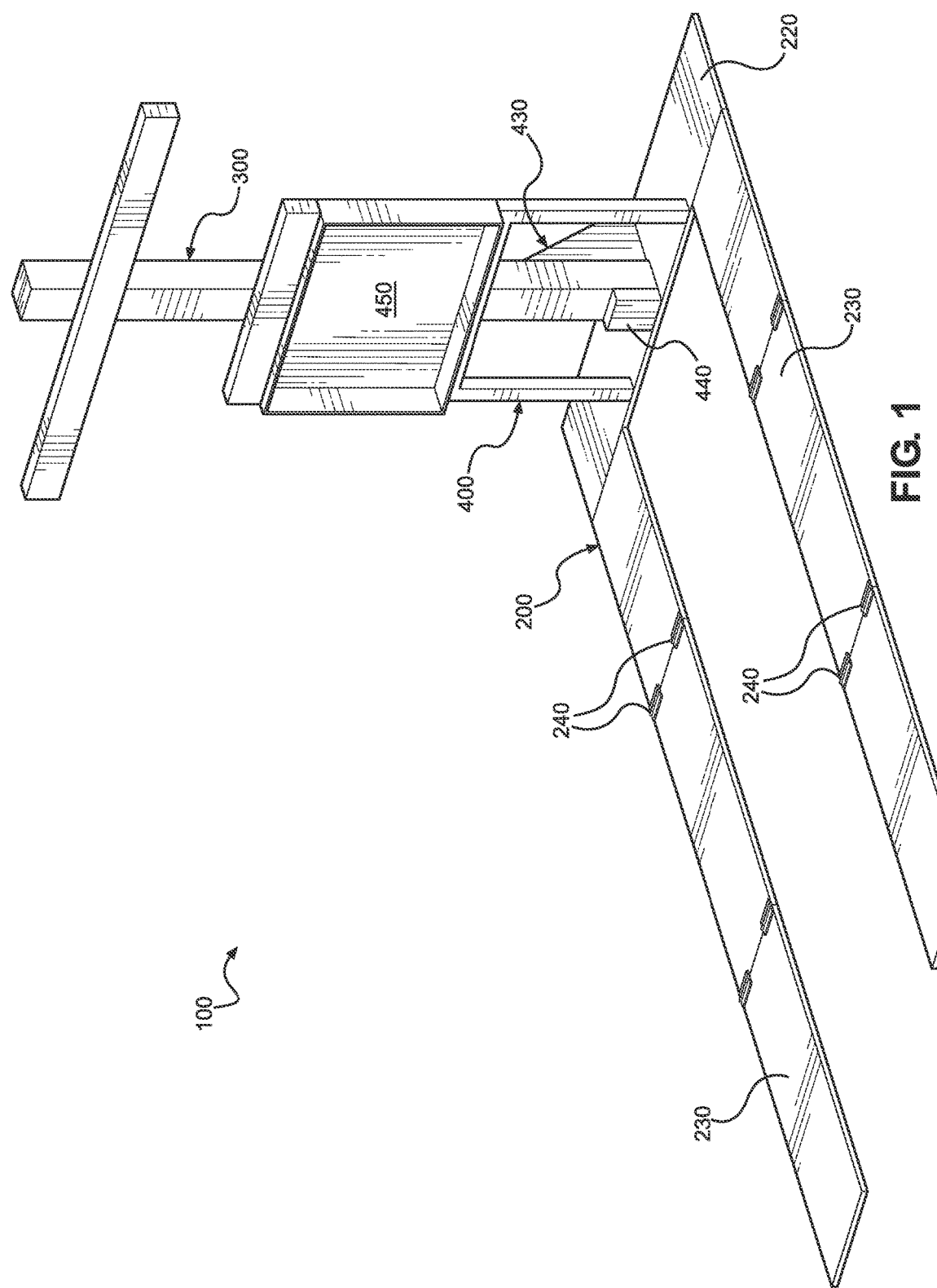
FIG. 1 is a perspective view of a moveable security apparatus of the present invention.
Figure 2:
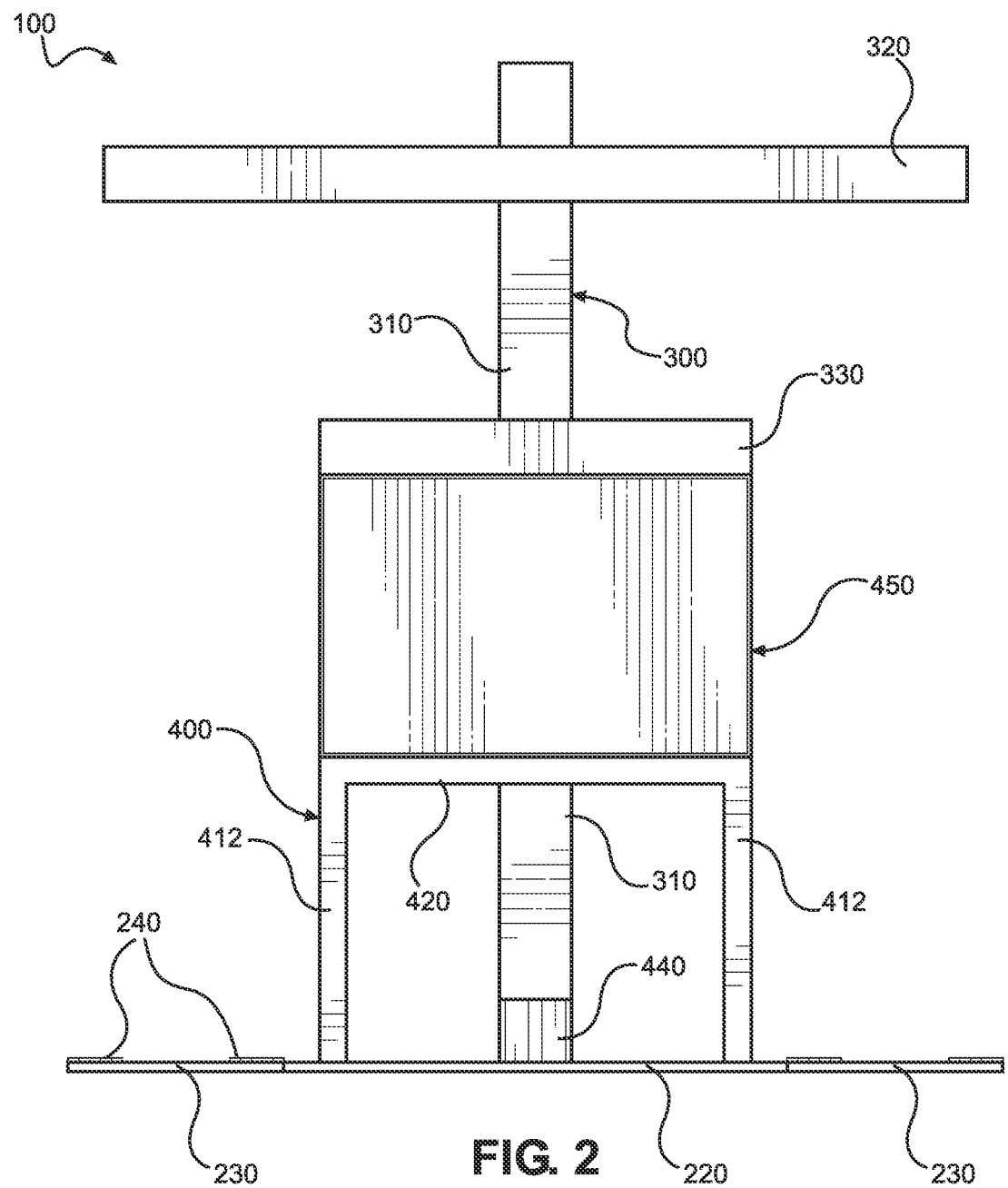
FIG. 2 is a front elevation view of the security apparatus of the present invention shown in FIG. 1.

The present invention is a cargo trailer access door security barrier apparatus which limits access to the interior contents of a trailer having outward-swing doors when the trailer is parked with the rear cargo doors abutting the apparatus. Referring to FIGS. 1 and 2, a preferred embodiment 100 of the present invention is shown, including a base assembly 200, support assembly 300, bollard 400, and a door handle block 450.

Figure 3:
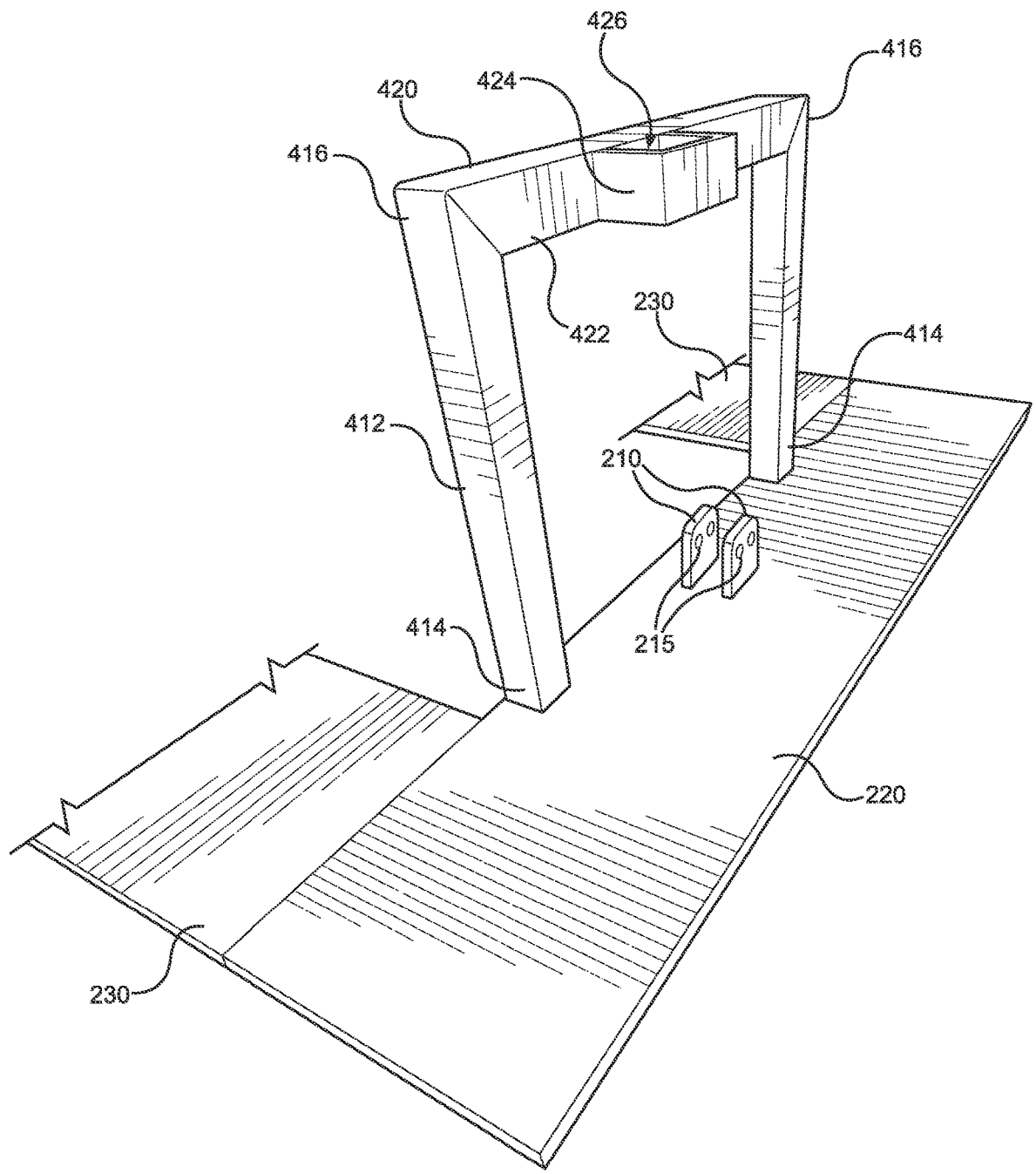
FIG. 3 is a rear perspective view of a base assembly of the security apparatus of the present invention shown in FIG. 1.
Figure 4:
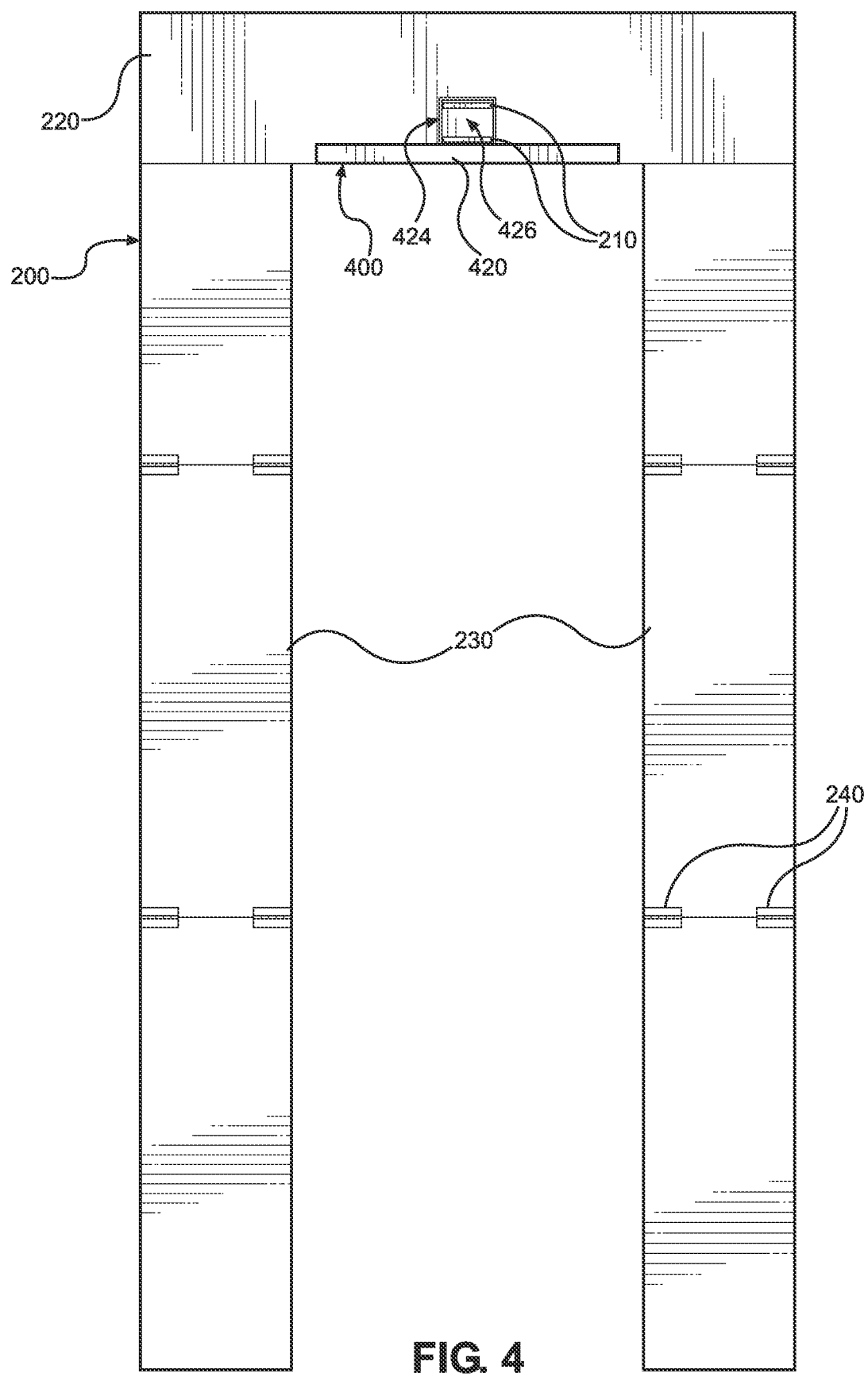
FIG. 4 is a top elevation view of the base assembly of the security apparatus of the present invention shown in FIG. 3.

Referring to FIGS. 1 through 4, the base assembly 200 includes a back plate 220, and a plurality of base plates 230 fastened together with standard hinges 240 to form flexible joints between the plates 230 to enable their stacking before movement of the assembled apparatus. Back plate 220 includes two parallel flanges 210 having apertures 215, and a bollard 400. In one embodiment, the bollard body 400 is an inverted U-shape, defined by a horizontal bar 420 and two vertical bars 412. The bottom ends 414 of vertical bars 412 are welded to back plate 220 and the upper ends 416 are welded to opposite ends of bar 420. As shown in FIGS. 3 and 4, rear surface 422 of horizontal bar 420 includes a collar 424 having an aperture 426 for receiving support assembly 300.

Figure 5:
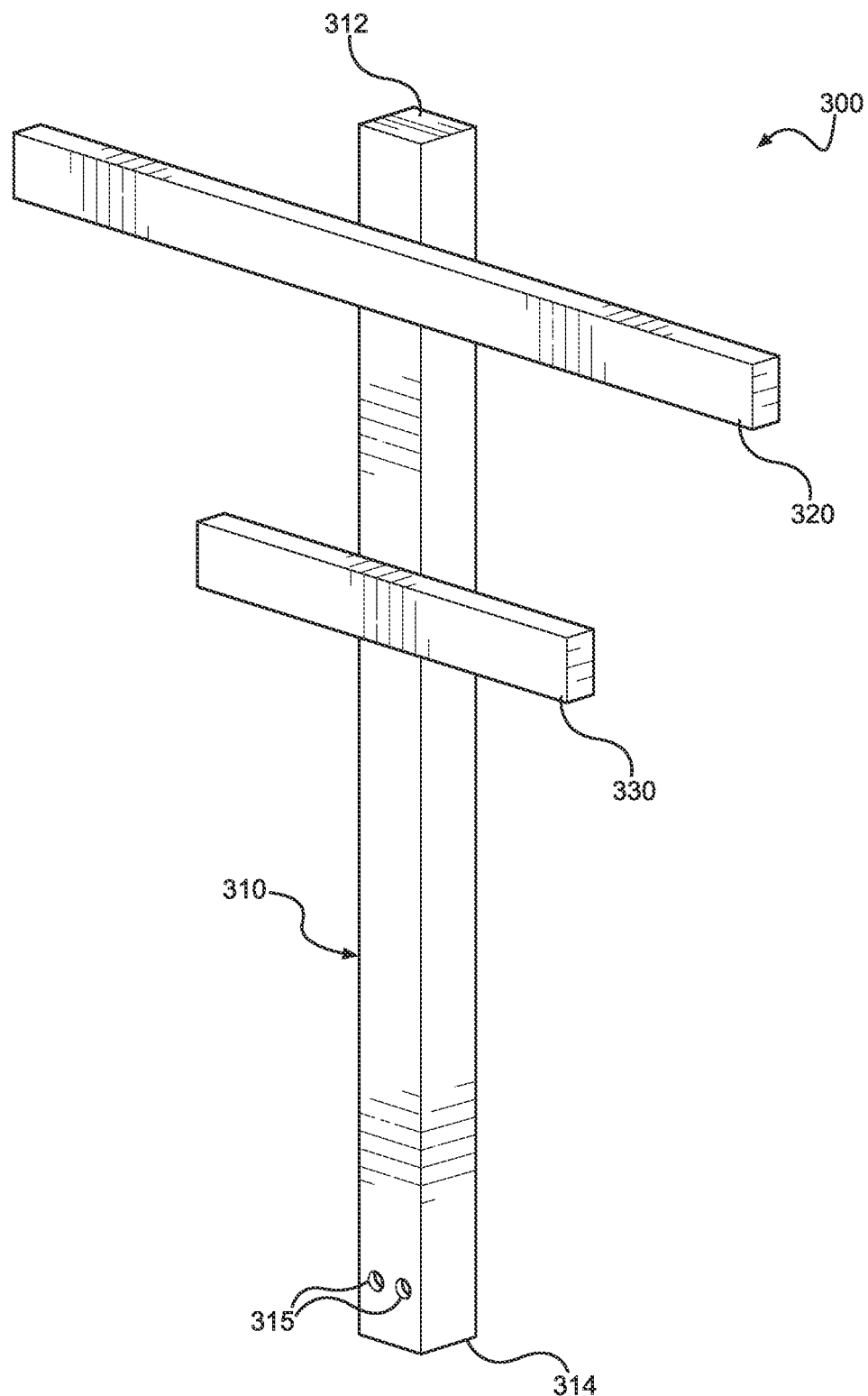
FIG. 5 is a front perspective view of a vertical support assembly of the security apparatus of the present invention shown in FIG. 1.
Figure 6:
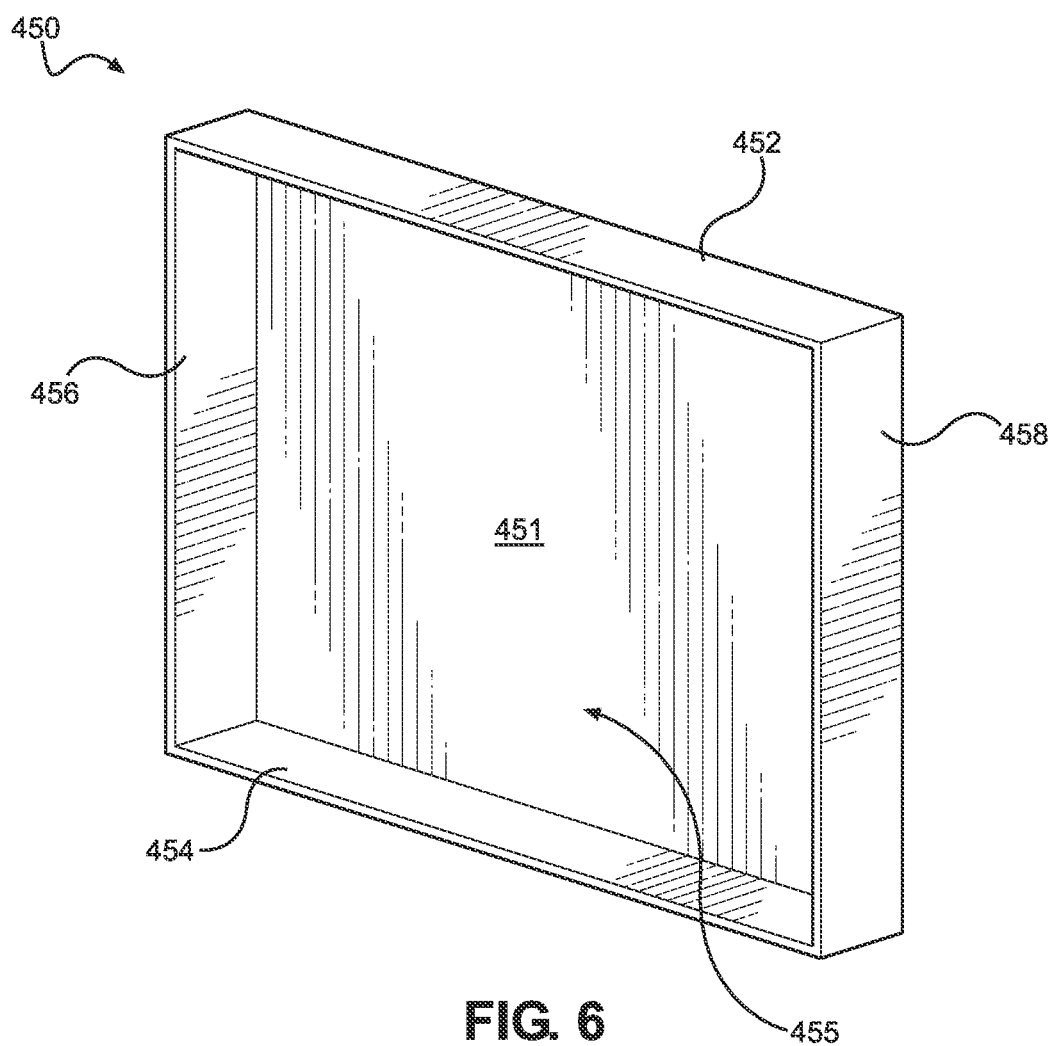
FIG. 6 is a front perspective view of a handle block of the security apparatus of the present invention shown in FIG. 1.
Figure 7:
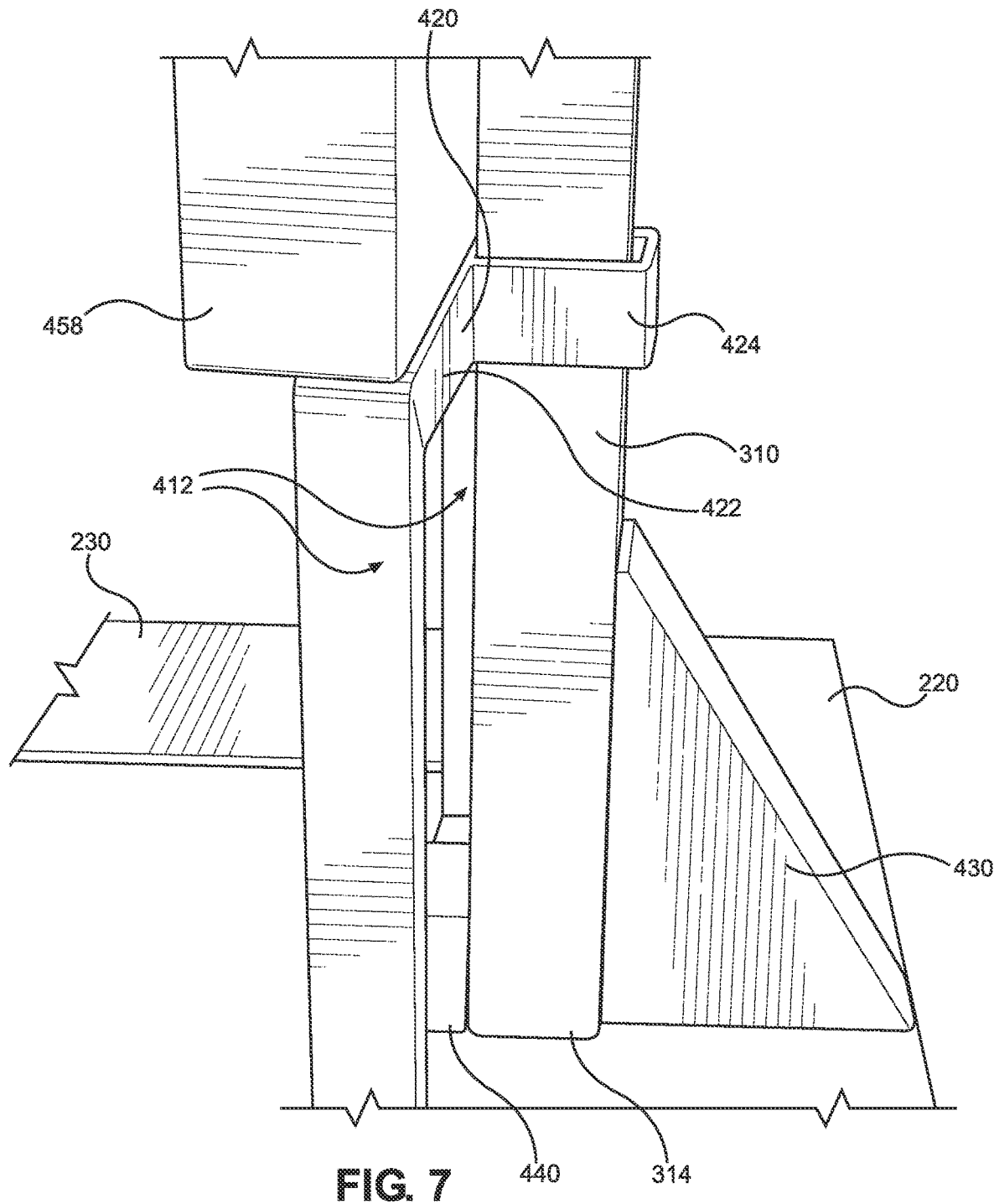
FIG. 7 is a side rear perspective view of the vertical support assembly and handle block secured to the base assembly of the security apparatus of the present invention shown in FIG. 1.

With continued reference to FIGS. 1 and 2, the details of the support assembly 300 are shown in FIG. 5. Support assembly 300 includes a vertical support post 310 having ends 312, 314, and two horizontal rails 320, 330. In the preferred configuration 100, upper rail 320 is of sufficient length such that the ends can be seen by a driver of a cargo trailer in the side view mirrors when backing the tractor-trailer into position such that the doors of the cargo trailer against the security barrier apparatus 100. The door handle block 450, as shown in FIG. 6, is an open box having a bottom surface 451, top side 452, bottom side 454, left side 456, and right side 458, which define interior space 455.

Figure 8:
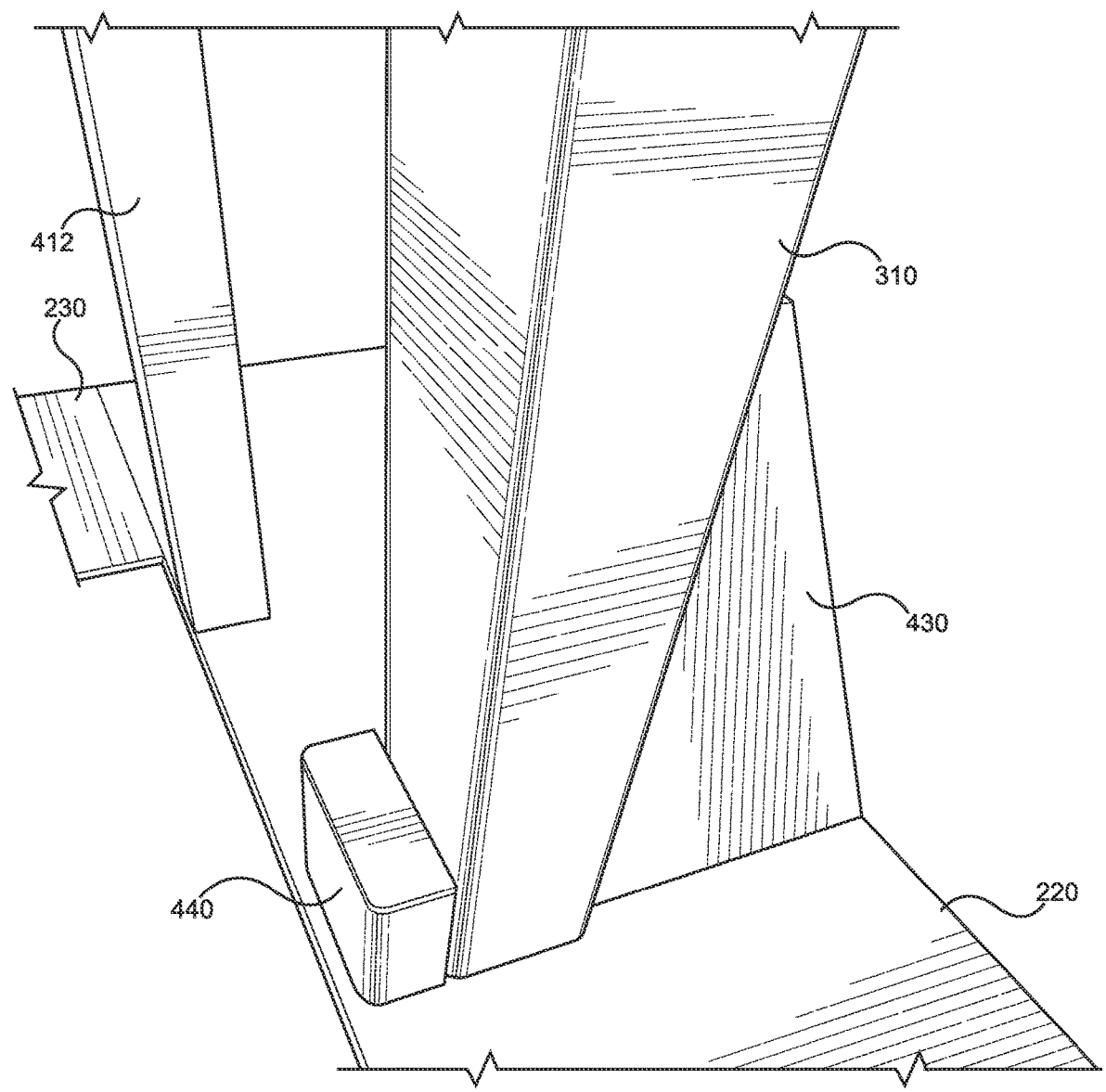
FIG. 8 is a side front perspective view of the vertical support assembly secured to the base assembly of the security apparatus of the present invention shown in FIG. 1.

As shown in FIGS. 1, 2, 3, 5, and 6, end 314 of vertical support post 310 of support assembly 300, passes through collar aperture 426 of bollard 400 and rests on back plate 220, receiving flanges 210 with apertures 215 and 315 positioned to receive two support bolts (not shown). Referring to FIG. 8, bolt cover 440 and back brace 430 are optionally included to prevent removal of the bolts and, thereby removing support assembly 300 from base assembly 200. Optionally, end 314 of pole 310 may be welded to back plate 220 using conventional means.

Figure 9:
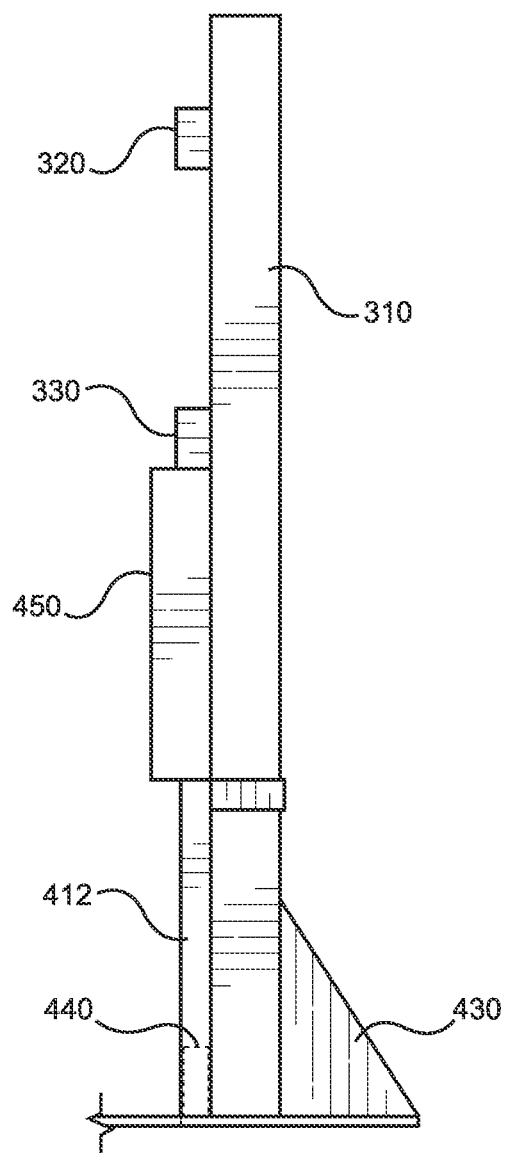
FIG. 9 is a side view of the security apparatus of the present invention shown in FIG. 1.

Referring to FIGS. 2, and 9, handle block 450 rests between lower horizontal arm 330 of pole 310 and bar 420 of bollard 400. Handle block top 452 is secured to horizontal arm 330 and block bottom 454 is secured to bollard horizontal bar 420 using conventional means.

In use, with plates 230 unfolded and extended, the driver of the tractor-trailer positions the tires of the cargo trailer onto plates 230, and backs the trailer toward the support assembly 300, using the ends of upper cross beam 320 as a guide to center the rear doors so that, once in position, the handle block 450 receives the door handles and latching mechanisms and shields to shield them from tampering. When correctly parked adjacent to security apparatus 100, the rear entry doors of the cargo trailer will remain proximal to horizontal beams 320, 330, preventing outward movement of the swing doors if the latch shield 450 is breached, thereby preventing access to the interior cargo space of a trailer.

Figure 10:
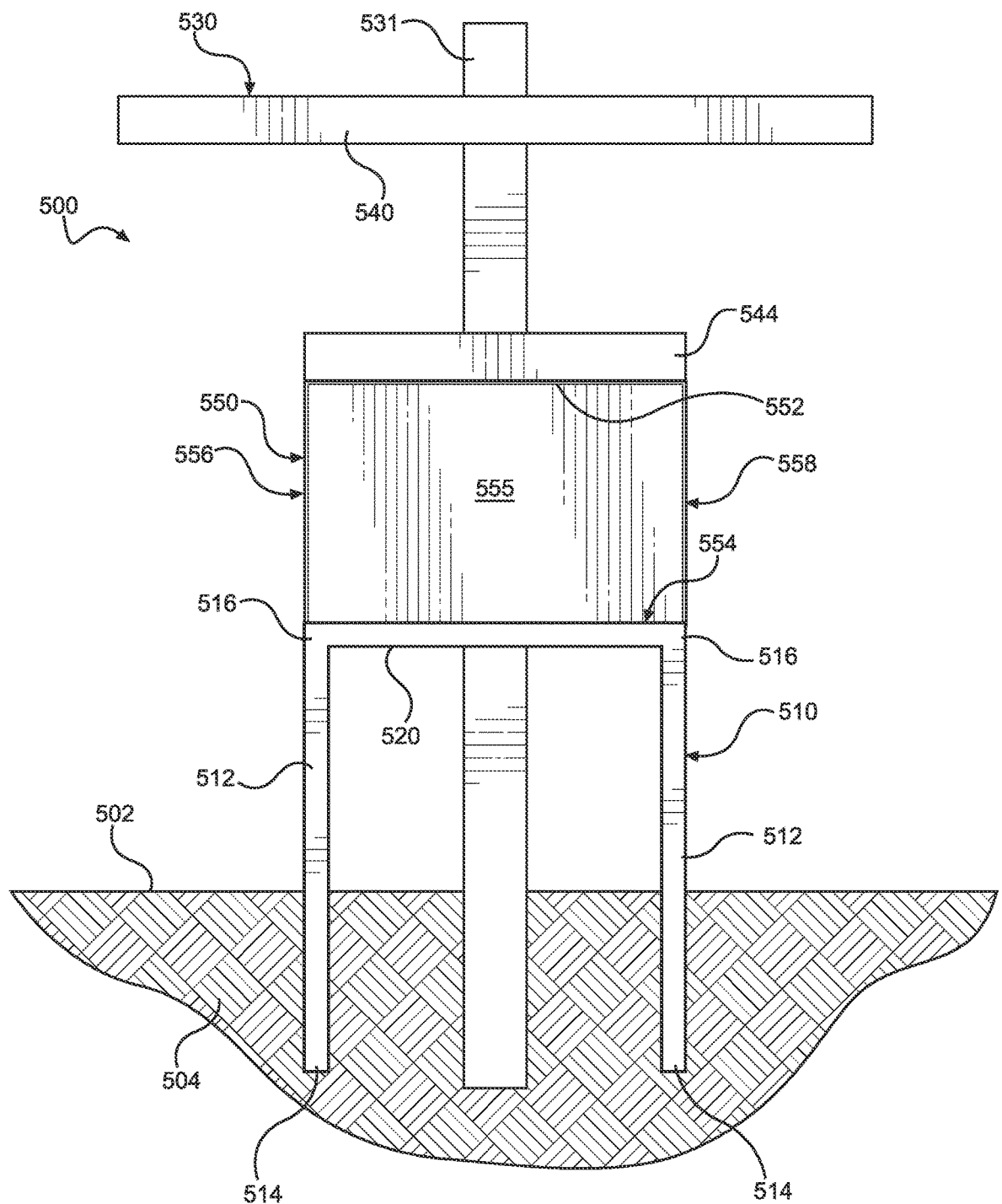
FIG. 10 is a front elevation view of an alternative embodiment of a non-moveable security apparatus of the present invention.

In an alternative embodiment, as exemplified in FIG. 10, security barrier 500 includes a bollard 510, support assembly 530, and door handle block 550. In this embodiment, bollard 510 includes horizontal bar 516 and vertical bars 512, and support assembly 530 includes vertical support post 531, and upper and lower parallel beams 540, 544. Sides 552 and 554 of block 550 are permanently attached to support post 532 between lower beam 544 and horizontal bar 516. In this embodiment, vertical rails 512 and support post 531 are set into ground 504 a sufficient distance below surface 502 to stabilize the structure 500 during use.

Figure 11:
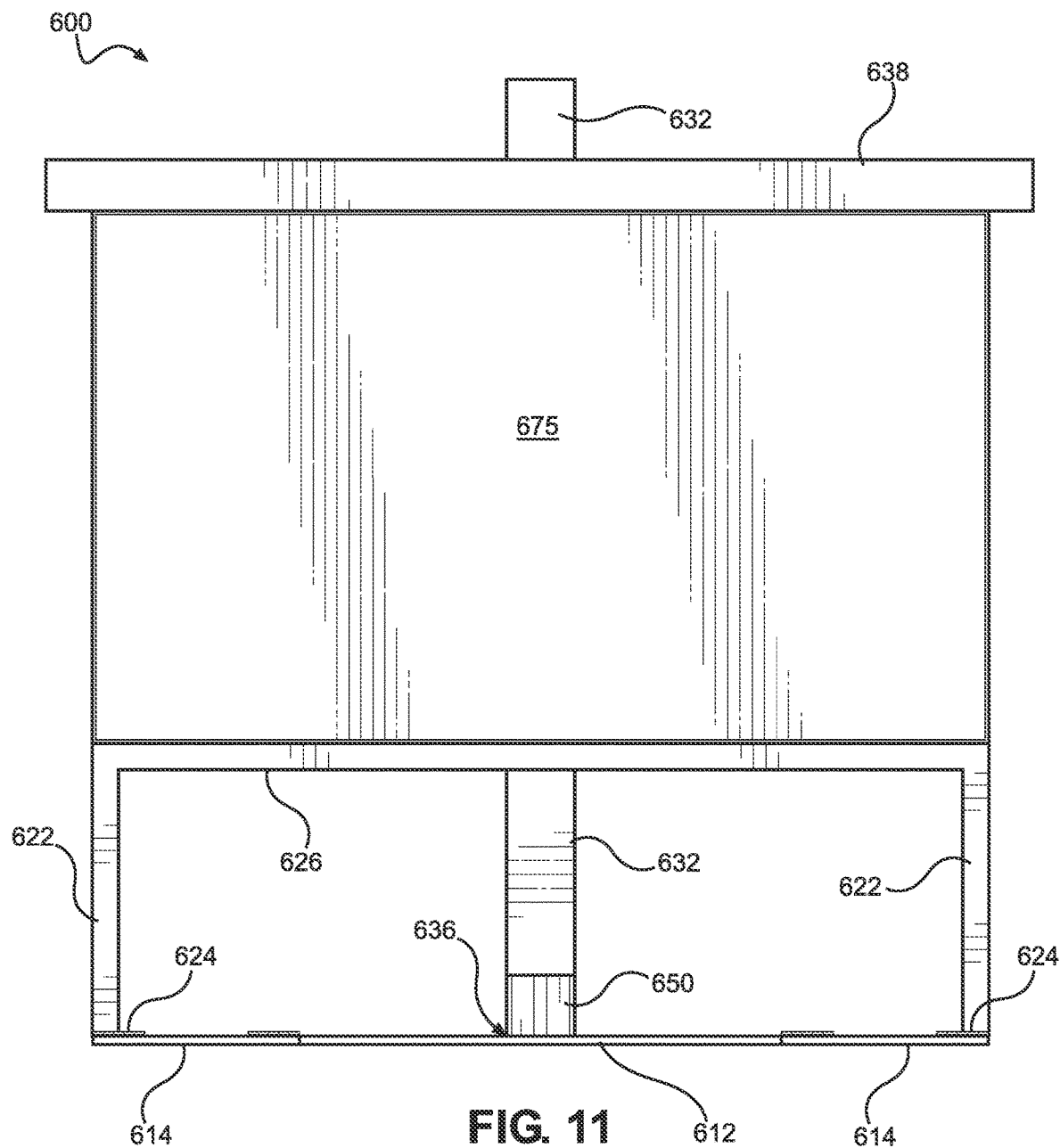
FIG. 11 is a front elevation view of an alternative embodiment of a moveable security apparatus of the present invention.
Figure 12:
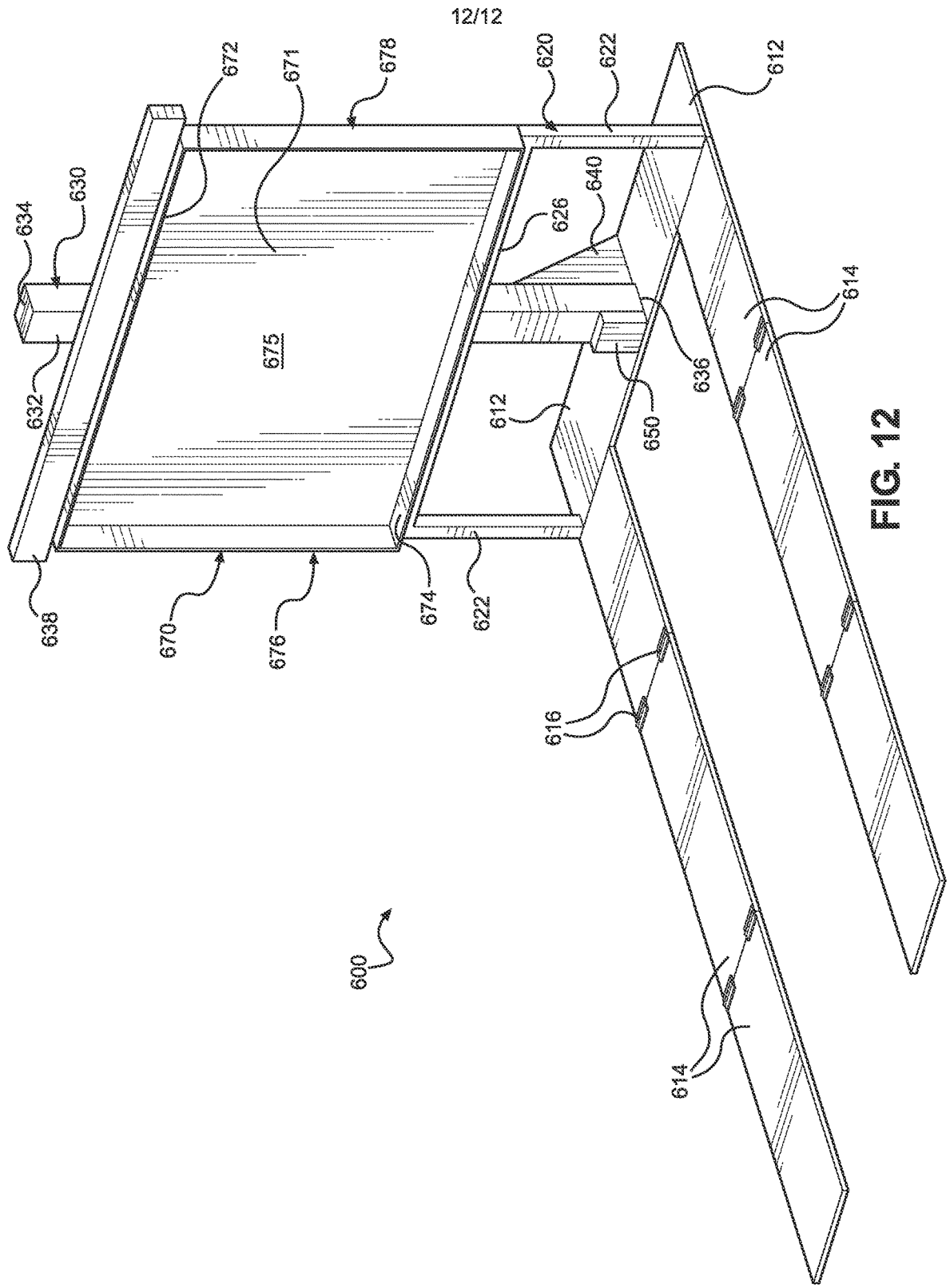
FIG. 12 is a perspective view of the alternative embodiment of the security apparatus shown in FIG. 11.

In yet another embodiment, a security barrier for use with a cargo trailer having a single rear-entry roll-up door is provided. As shown in FIGS. 11 and 12, security barrier 600 includes base assembly 610, support assembly 630 and handle block 670. Base assembly 610 includes back plate 612, foldable plates 614, and hinges 616. Bollard 620 includes vertical legs 622 supporting horizontal bar 626. Support assembly 630 includes vertical support post 632, and a single horizontal rail 638. Sides 672 and 674 of handle block 670 is fixed to central post 632 between rail 638 and bar 626.

It will be readily understood by one skilled in the art that multiple moveable or fixed security barrier systems 100, 500, 600 may be used together in alternative configurations to facilitate space conservation for temporary parking of multiple cargo trailers in an unsecured public parking area.

It will be understood and appreciated by those skilled in the art that the present invention may be changed or modified for use on other cargo vehicles having rear entry doors without departing from the spirit and scope of the invention as defined in the claims.

What is claimed is:

1. A moveable cargo door security apparatus for decreasing the risk of theft from a cargo trailer having a rear swing door entry, said apparatus comprising:
    a base assembly having a base plate with a front edge and a bollard having a top rail and two vertical posts;
    a support assembly having a vertical post with a front surface, an upper horizontal cross beam, and a lower horizontal cross beam, wherein said upper and lower cross beams are mounted to the front surface of said vertical post of the support assembly; and
    a handle block mounted on the front surface of said vertical post of the support assembly between the lower horizontal cross beam of said support assembly and the top rail of said bollard.

2. The security apparatus of claim 1, wherein said base assembly further comprises two extension plates attached to the front edge of said base plate.

3. The security apparatus of claim 2, wherein said base assembly further comprises a plurality of extension plates movably hinged together.

4. The security apparatus of claim 1, wherein the top rail of the bollard of said base assembly further comprises a collar having an aperture for receiving the vertical post of said support assembly therethrough.

5. A moveable cargo door security apparatus for decreasing the risk of theft from a cargo trailer having a single rear entry roll-up door, said apparatus comprising:
    a base assembly having a base plate with a front edge and a bollard having a top rail and two vertical posts;
    a support assembly having a vertical post with a front surface, and a horizontal cross beam mounted to the front surface of said vertical post of the support assembly; and
    a handle block mounted on the front surface of said vertical post of the support assembly between the horizontal cross beam of said support assembly and the top rail of said bollard.

6. The security apparatus of claim 5, wherein top rail of the bollard of said base assembly further comprises a collar having an aperture for receiving the vertical post of said support assembly therethrough.

7. A security apparatus for decreasing the risk of theft from a cargo trailer having a rear swing door entry, said apparatus comprising:
    a bollard having a top rail and two vertical posts;
    a support assembly having a vertical post with a front surface, an upper horizontal cross beam, and a lower horizontal cross beam, wherein said upper and lower cross beams are mounted to the front surface of said vertical post of the support assembly; and
    a handle block mounted on the front surface of said vertical post of the support assembly between the lower cross beam of said support assembly and the top rail of said bollard.

8. The security apparatus of claim 7, wherein the top rail of said bollard further comprises a collar for receiving the vertical post of the support assembly therethrough.

9. The security apparatus of claim 7, wherein the vertical posts of said bollard and the vertical post of said support assembly each have a lower end, said lower ends being secured into the ground.

\* \* \* \* \*